PAUL OSCAR ROBERT STROINSKI, OF BOSTON, MASSACHUSETTS.

Letters Patent No. 87,802, dated March 16, 1869.

IMPROVED MEDICAL COMPOUND.

The Schedule referred to in these Letters Patent and making part of the same.

*To all whom it may concern:*

Be it known that I, PAUL OSCAR ROBERT STROINSKI, of Boston, in the county of Suffolk, and State of Massachusetts, have invented an Improved Composition for Medical Purposes; and I hereby declare that the following is a full, clear, and exact description thereof.

This invention consists in a composition, to be applied externally, for the cure of scrofulous humors, ulcers, wounds, &c.

To enable others skilled in the art to understand and use my invention, I will proceed to describe the manner in which I have carried it out.

I mix together the following ingredients, in about the proportions specified, viz:

Three ounces of soft soap.
One-half ounce of starch.
One-quarter ounce of vitriol.
One and one-half ounce of salt.
One and one-half ounce of English "annotta."
One gallon of gasoline, (71 gravity.)

The medical composition, thus produced, is to be applied externally, and will be found extremely efficacious for healing scrofulous humors, ulcers, wounds, &c., the soft soap, starch, and salt, possessing superior healing-properties, while the gasoline penetrates the pores of the skin, rendering it smooth, soft, and elastic, thereby assisting and accelerating the healing-process.

The annotta is employed merely as a coloring-matter.

The proportions of the above-named ingredients may be varied slightly without departing from the spirit of my invention, and the "annotta" may be omitted, if desired.

Claim.

What I claim as my invention, and desire to secure by Letters Patent, is—

The within-described composition, formed of the above-named ingredients, in about the proportions, and for the purposes herein set forth.

PAUL OSCAR ROBERT STROINSKI.

Witnesses:
P. E. TESCHEMACHER,
W. J. CAMBRIDGE.